(12) United States Patent
Tan

(10) Patent No.: US 10,564,862 B2
(45) Date of Patent: Feb. 18, 2020

(54) WEAR LEVELING METHOD, MEMORY CONTROL CIRCUIT UNIT AND MEMORY STORAGE APPARATUS

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 15/989,197

(22) Filed: May 25, 2018

(65) Prior Publication Data

US 2019/0317673 A1 Oct. 17, 2019

(30) Foreign Application Priority Data

Apr. 11, 2018 (TW) .............................. 107112458 A

(51) Int. Cl.
*G06F 3/06* (2006.01)
*G06F 12/1009* (2016.01)

(52) U.S. Cl.
CPC ............ *G06F 3/0616* (2013.01); *G06F 3/065* (2013.01); *G06F 3/0652* (2013.01); *G06F 3/0679* (2013.01); *G06F 12/1009* (2013.01); *G06F 2212/1036* (2013.01); *G06F 2212/7201* (2013.01)

(58) Field of Classification Search
CPC ...... G06F 3/0616; G06F 3/065; G06F 3/0652; G06F 3/0679; G06F 12/1009; G06F 2212/1036; G06F 2212/7201
See application file for complete search history.

(56) References Cited

U.S. PATENT DOCUMENTS

2010/0037001 A1* 2/2010 Langlois ............. G06F 12/0246 711/103
2015/0277541 A1* 10/2015 Jain ..................... G06F 12/0846 713/320

* cited by examiner

*Primary Examiner* — Aracelis Ruiz
(74) *Attorney, Agent, or Firm* — JCIPRNET

(57) ABSTRACT

A wear leveling method for a rewritable non-volatile memory module, a memory control circuit unit, and a memory storage apparatus are provided. The rewritable non-volatile memory module includes a plurality of physical erasing units. The method includes: recording an operation value of each of the physical erasing units; recording a usage situation value of each of the physical erasing units; and selecting a first physical erasing unit and a second physical erasing unit from the physical erasing units according to the operation values of the physical erasing units and the usage situation values of the physical erasing units and copying valid data stored in the first physical erasing unit to the second physical erasing unit.

15 Claims, 10 Drawing Sheets

WEAR LEVELING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 107112458, filed on Apr. 11, 2018. The entirety of the above-mentioned patent application is hereby incorporated by reference herein and made a part of this specification.

BACKGROUND

Technical Field

The present invention relates to a rewritable non-volatile memory module. More particularly, the invention relates to a wear leveling method, a memory control circuit unit, and a memory storage apparatus.

Description of Related Art

The growth of digital cameras, mobile phones, and MP3 players has been rapid in recent years, resulting in escalated demand for storage media by consumers. A rewritable non-volatile memory has characteristics, such as data non-volatility, low power consumption, compact size, no mechanical structure, and fast reading/writing speed, and thus is particularly ideal for portable electronic products, e.g. laptop computers. A solid state drive is a memory storage device that adopts a flash memory as the storage medium. Therefore, the flash memory industry has become popular among the electronic industries.

Generally, in order to prolong the lifespan of a rewritable non-volatile memory module, physical erasing units in the rewritable non-volatile memory module are used as uniformly as possible. The conventional wear leveling method is performed as follows: after being executed for a period of fixed time, the rewritable non-volatile memory module switches the physical erasing unit in a data area and the physical erasing unit in a spare area so that the physical erasing unit that has a less operation value in the data area can be switched to the spare area to be programmed (or written).

If performing the wear leveling operation so as to switch the physical erasing unit having the less operation value to the spare area, the physical erasing unit having a greater operation value in the spare area is selected most of the time to be switched to the data area. If data stored in this physical erasing unit is updated frequently, this physical erasing unit is likely to be associated with the spare area again if the data is updated. Nevertheless, if the wear leveling operation is required to be performed next time, this physical erasing unit associated with the spare region again is more likely to be switched to the data area once again compared to the rest of the physical erasing units since this physical erasing unit has a greater operation value compared to the rest of the physical erasing units. In this case, the physical erasing units in the rewritable non-volatile memory module are not used equally.

Accordingly, how to effectively measure the degree of wear of the physical erasing units so as to perform the wear leveling operation and thereby effectively prolong the lifespan of the rewritable non-volatile memory module is one of the major subjects to be addressed by those skilled in the art.

SUMMARY

The present invention provides a wear leveling method, a memory control circuit unit, and a memory storage apparatus.

In an exemplary embodiment of the present invention, a wear leveling method configured for a rewritable non-volatile memory module is provided. The rewritable non-volatile memory module includes a plurality of physical erasing units. The wear leveling method includes recording an operation value of each of the physical erasing units, wherein the operation values are configured for reflecting absolute or relative erasing or programming counts of the physical erasing units. The wear leveling method also includes recoding a usage situation value of each of the physical erasing units, wherein the usage situation values are configured for reflecting absolute or relative no operation time lengths of the physical erasing units. The wear leveling method further includes selecting a first physical erasing unit and a second physical erasing unit from the physical erasing units according to the operation values of the physical erasing units and the usage situation values of the physical erasing units, and copying valid data stored in the first physical erasing unit to the second physical erasing unit.

In an exemplary embodiment of the present invention, a memory control circuit unit configured for controlling a rewritable non-volatile memory module is provided. The rewritable non-volatile memory module includes a plurality of physical erasing units. The memory control circuit unit includes a host interface, a memory interface, and a memory management circuit. The host interface is coupled to a host system. The memory interface is coupled to the rewritable non-volatile memory module. The memory management circuit is coupled to the host interface and the memory interface. The memory management circuit is coupled to the host interface and the memory interface. The memory manage circuit is configured for recording an operation value of each of the physical erasing units. The operation values are configured for reflecting absolute or relative erasing or programming counts of the physical erasing units. The memory manage circuit is further configured for recording a usage situation value of each of the physical erasing units. The usage situation values are configured for reflecting absolute or relative no operation time lengths of the physical erasing units. In addition, the memory management circuit is further configured for selecting a first physical erasing unit and a second physical erasing unit from the physical erasing units according the operation values of the physical erasing units and the usage situation values of the physical erasing units and copies valid data stored in the first physical erasing unit to the second physical erasing unit.

In an exemplary embodiment of the present invention, a memory storage apparatus including a connection interface unit, a rewritable non-volatile memory module, and a memory control circuit unit is provided. The connection interface unit is coupled to a host system. The rewritable non-volatile memory module includes a plurality of physical erasing units. The memory control circuit unit is coupled to the connection interface unit and the rewritable non-volatile memory module. The memory control circuit unit is configured for recording an operation value of each of the physical erasing units. The operation values are configured for reflecting absolute or relative erasing or programming counts of the physical erasing units. The memory control circuit unit is further configured for recording a usage situation value of each of the physical erasing units. The usage situation values are configured for reflecting absolute or relative no operation time lengths of the physical erasing units. The memory control circuit unit is further configured for selecting a first physical erasing unit and a second physical erasing unit from the physical erasing units according the operation values of the physical erasing units and the usage situation values of the physical erasing units and copying valid data stored in the first physical erasing unit to the second physical erasing unit.

To sum up, in the wear leveling method, the memory control circuit unit, and the memory storage apparatus provided by the embodiments of the invention, whether data not being frequently updated is stored in the physical erasing unit can be determined by counting the usage situation values of the physical erasing units and the operation values of the physical erasing units. Moreover, the data not being frequently updated is programmed to the physical erasing unit having a greater operation value in the spare area. This physical erasing unit is then associated with the data area, and that this physical erasing unit is prevented from being associated to the spare area again and thus is less likely to be programmed. As such, the numbers of times of operation of the physical erasing units are relatively more equalized, and that the lifespan of the rewritable non-volatile memory module is prolonged.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Generally, a memory storage apparatus (i.e., a memory storage system) includes a rewritable non-volatile memory module and a controller (i.e., a control circuit unit). The memory storage apparatus is usually configured together with a host system so that the host system may write data into the memory storage apparatus or read data from the memory storage apparatus.

Figure 1:
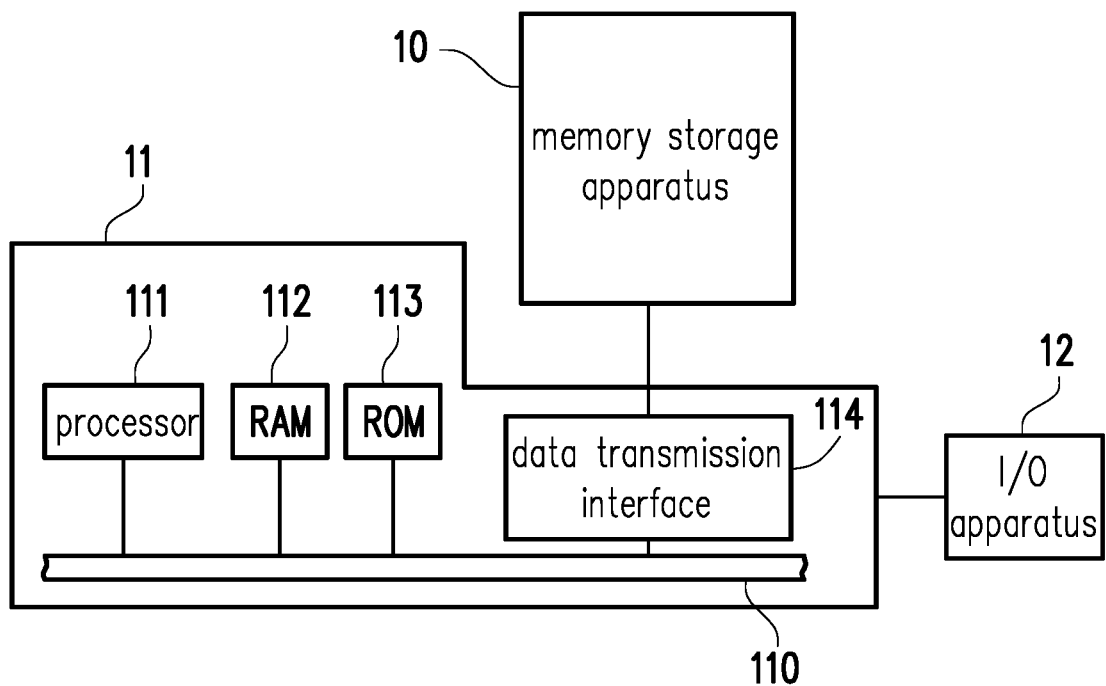
FIG. 1 is a schematic diagram illustrating a host system, a memory storage apparatus and an input/output (I/O) apparatus according to an exemplary embodiment.
Figure 2:
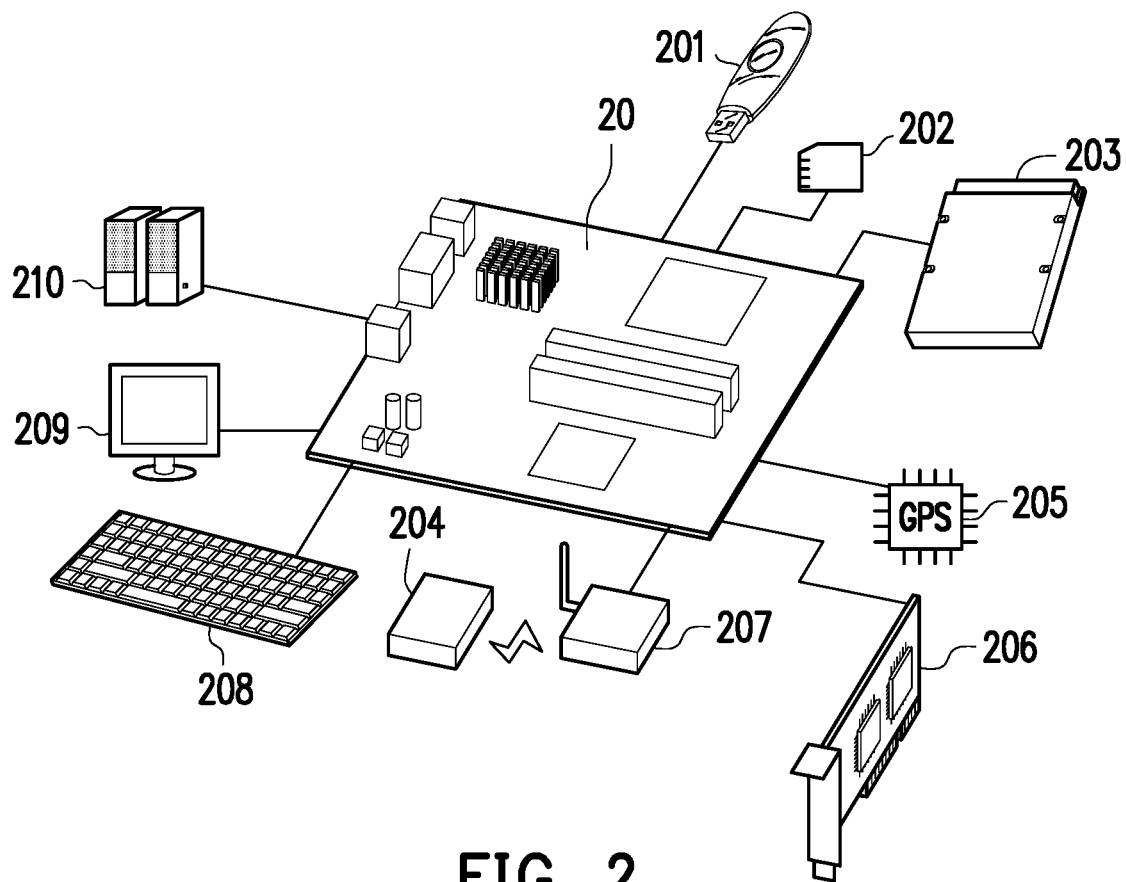
FIG. 2 is a schematic diagram illustrating a host system, a memory storage apparatus and an input/output (I/O) apparatus according to another exemplary embodiment.

FIG. 1 is a schematic diagram illustrating a host system, a memory storage apparatus and an input/output (I/O) apparatus according to an exemplary embodiment, and FIG. 2 is a schematic diagram illustrating a host system, a memory storage apparatus and an input/output (I/O) apparatus according to another exemplary embodiment.

Referring to FIG. 1 and FIG. 2, a host system 11 generally includes a processor 111, a random access memory (RAM) 112, a read only memory (ROM) 113 and a data transmission interface 114. The processor 111, the random access memory 112, the read only memory 113, and the data transmission interface 114 are all coupled to a system bus 110.

In this exemplary embodiment, the host system 11 is coupled to a memory storage apparatus 10 through the data transmission interface 114. For example, the host system 11 can write data into the memory storage apparatus 10 or read data from the memory storage apparatus 10 through the data transmission interface 114. Further, the host system 111 is coupled to an I/O apparatus 12 through the system bus 110. For example, the host system 11 can transmit an output signal to the I/O apparatus 12 or receive an input signal from the I/O apparatus 12 through the system bus 110.

In this exemplary embodiment, the processor 111, the random access memory 112, the read only memory 113 and the data transmission interface 114 may be disposed on a main board 20 of the host system 11. A number of the data transmission interface 114 may be one or plural. The main board 20 may be coupled to the memory storage apparatus 10 by wired or wireless means through the data transmission interface 114. The memory storage apparatus 10 may be, for example, a flash drive 201, a memory card 202, a solid state drive (SSD) 203 or a wireless memory storage apparatus 204. The wireless memory storage apparatus 204 may be, for example, a memory storage apparatus based on various wireless communication technologies, such as a near field communication storage (NFC) memory storage apparatus, a Wireless Fidelity (WiFi) memory storage apparatus, a Bluetooth memory storage apparatus, a low energy Bluetooth memory storage device (e.g., iBeacon). Further, the main board 20 may also be coupled to various I/O apparatuses including a global positioning system (GPS) module 205, a network interface card 206, a wireless transmission device 207, a keyboard 208, a screen 209, and a speaker 210 through the system bus 110. For example, in an exemplary embodiment, the main board 20 can access the wireless memory storage apparatus 204 through the wireless transmission apparatus 207.

Figure 3:
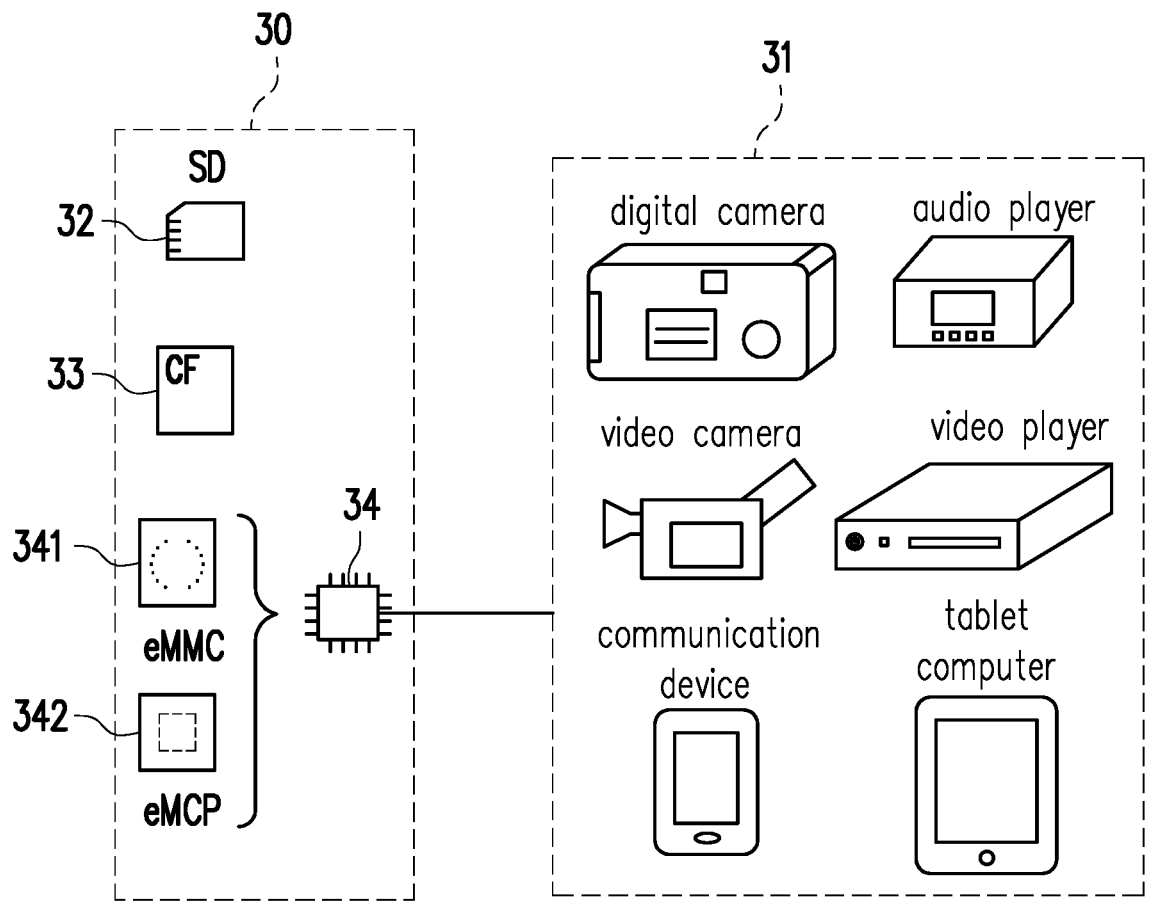
FIG. 3 is a schematic diagram illustrating a host system and a memory storage apparatus according to another exemplary embodiment.

In an exemplary embodiment, the host system mentioned may be any systems capable of substantially cooperating with the memory storage apparatus for storing data. Although the host system is illustrated as a computer system in the foregoing exemplary embodiment; nevertheless, the disclosure is not limited thereto. FIG. 3 is a schematic diagram illustrating a host system and a memory storage apparatus according to another exemplary embodiment.

Referring to FIG. 3, in another exemplary embodiment, a host system 31 may also be a system including a digital camera, a video camera, a communication device, an audio player, a video player or a tablet computer, whereas a memory storage device 30 can be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an embedded MMC (eMMC) 341 and/or an embedded Multi Chip Package (eMCP) 342.

Figure 4:
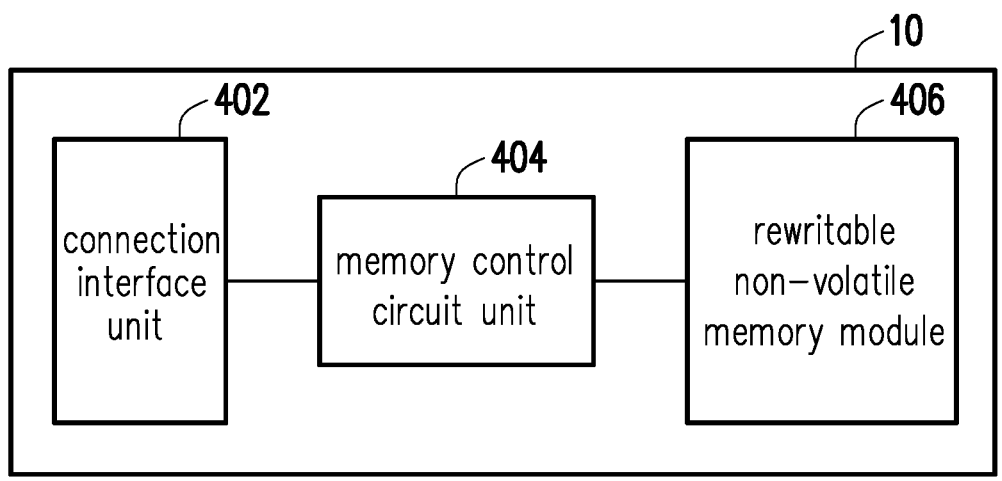
FIG. 4 is a schematic block diagram illustrating a host system and a memory storage apparatus according to an exemplary embodiment.

FIG. 4 is a schematic block diagram illustrating a host system and a memory storage apparatus according to an exemplary embodiment.

Referring to FIG. 4, the memory storage apparatus 10 includes a connection interface unit 402, a memory control circuit unit 404, and a rewritable non-volatile memory module 406.

In this exemplary embodiment, the connection interface unit 402 complies with a secure digital (SD) interface standard. Nevertheless, it should be understood that the invention is not limited thereto. The connection interface unit 402 may also be compatible to a Serial Advanced Technology Attachment (SATA) standard, a Parallel Advanced Technology Attachment (PATA) standard, an Institute of Electrical and Electronic Engineers (IEEE) 1394 standard, a Peripheral Component Interconnect Express (PCI Express) interface standard, a Universal Serial Bus (USB) standard, an Ultra High Speed-I (UHS-I) interface standard, an Ultra High Speed-II (UHS-II) interface standard, a Memory Stick (MS) interface standard, a Multi-Chip Package interface standard, a Multi Media Card (MMC) interface standard, an Embedded Multimedia Card (eMMC) interface standard, an Universal Flash Storage (UFS) interface standard, an embedded Multi Chip Package (eMCP) interface standard, a Compact Flash (CF) interface standard, an Integrated Device Electronics (IDE) standard or other suitable standards. In this exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control commands which are implemented in form of hardware or firmware and to execute operations of writing, reading or erasing data in the rewritable non-volatile memory module 406 according to the commands of the host system 11.

The rewritable non-volatile memory module 406 is coupled to the memory control circuit unit 404 and is configured to store data written by the host system 11. The rewritable non-volatile memory storage module 406 includes a plurality of physical erasing units (i.e., physical blocks) 410(0) to 410(N). For example, the physical erasing units 410(0) to 410(N) may belong to the same memory die or belong to different memory dies. Each of the physical erasing units has a plurality of physical pages (i.e., physical programming units), and the physical pages of the same physical erasing unit may be written separately and erased simultaneously. However, it should be noted that the invention is not limited thereto. Each of the physical erasing units may be composed of 64 physical pages, 256 physical pages or physical pages of any other number.

More specifically, the physical erasing unit is the minimum unit for erasing. Namely, each of the physical erasing units contains the least number of memory cells to be erased together. The physical programming units are the minimum units for programming. That is, the physical programming units are the minimum unit for writing data. Each of the physical programming units usually includes a data bit area and a redundancy bit area. The data bit area having multiple physical access addresses is used to store user data, and the redundant bit area is used to store system data (e.g., control information and error correcting code). In this exemplary embodiment, each of the data bit areas of the physical programming units contains 8 physical access addresses, and the size of each of the physical access addresses is 512 bytes. However, in other exemplary embodiments, the data bit area may also include more or less of the physical access addresses, and the size and the number of the physical access addresses are not limited in the invention. For example, in an exemplary embodiment, the physical erasing unit is a physical block, and the physical programming unit is a physical page or a physical sector, but the invention is not limited thereto.

In this exemplary embodiment, the rewritable non-volatile memory module 406 is a Single Level Cell (SLC) NAND flash memory module (i.e., a flash memory module capable of storing 1 data bit in one memory cell). Nevertheless, the invention is not limited thereto. The rewritable non-volatile memory module 406 may also be a Multi Level Cell (MLC) NAND flash memory module, (i.e., a flash memory module capable of storing 2 data bits in one memory cell), a Trinary Level Cell (TLC) NAND flash memory module (i.e., a flash memory module capable of storing 3 data bits in one memory cell), or any memory module having the same features.

Figure 5:
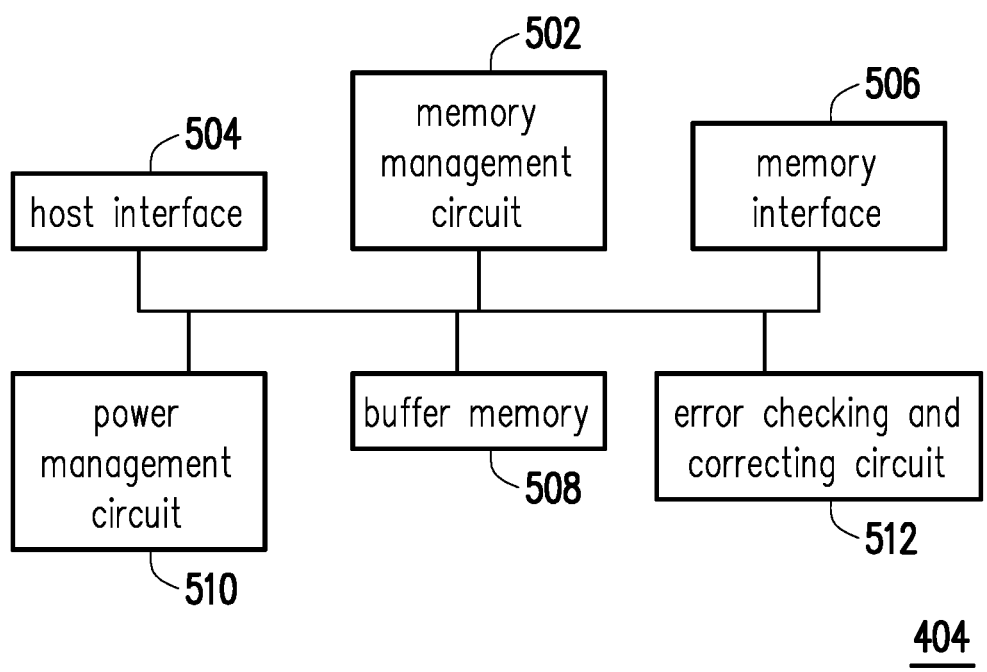
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, and a memory interface 506.

The memory management circuit 502 is configured to control overall operations of the memory control circuit unit 404. Specifically, the memory management circuit 502 has a plurality of control commands. If the memory storage apparatus 10 operate, the control commands are executed to perform various operations such as data writing, data reading, and data erasing.

In this exemplary embodiment, the control instructions of the memory management circuit 502 are implemented in the form of firmware. For instance, the memory management circuit 502 has a microprocessor unit (not shown) and a read-only memory (not shown), and the control instructions are burnt into the read-only memory. During the operations of the memory storage apparatus 10, the control instructions are executed by the microprocessor to perform operations of writing, reading or erasing data.

In another exemplary embodiment, the control instructions of the memory management circuit 502 may also be stored into a specific area (e.g., a system area in the memory module exclusively used for storing system data) of the rewritable non-volatile memory module 406 as program codes. In addition, the memory management circuit 502 has a microprocessor unit (not shown), a read only memory (not shown), and a random access memory (not shown). Particularly, the read only memory has a boot code, which is executed by the microprocessor unit to load the control commands stored in the rewritable non-volatile memory module 406 to the random access memory of the memory management circuit 502 if the memory control circuit unit 404 is enabled. Thereafter, the control commands are executed by the microprocessor unit to execute operations of writing, reading or erasing data.

Further, in another exemplary embodiment of the invention, the control commands of the memory management circuit 502 may also be implemented in the form of hardware. For example, the memory management circuit 502 includes a microprocessor, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microprocessor. Among them, the memory management circuit is configured for managing the physical blocks of the rewritable non-volatile memory module 406; the memory writing circuit is configured to issue a write command to the rewritable non-volatile memory module 406 in order to write data into the rewritable non-volatile memory module 406; the memory reading circuit is configured to issue a read command to the rewritable non-volatile memory module 406 in order to read data from the rewritable non-volatile memory module 406; the memory erasing circuit is configured to issue an erasing command to the rewritable non-volatile memory module 406 in order to erasing data from the rewritable non-volatile memory module 406; and the data processing circuit is configured to process data to be written into the rewritable non-volatile memory module 406 and data to be read from the rewritable non-volatile memory module 406.

The host interface 504 is coupled to the memory management circuit 502 and is coupled to the connection interface unit 402, so as to receive and identify commands and data sent from the host system 11. In other words, the commands and the data sent from the host system 11 are transmitted to the memory management circuit 502 through the host interface 504. In this exemplary embodiment, the host interface 504 is compatible to the SATA standard. However, it should be understood that the invention is not limited thereto, and the host interface 504 may also be compatible with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable standards for data transmission.

The memory interface 506 is coupled to the memory management circuit 502 and is configured to access the rewritable non-volatile memory module 406. In other words, data to be written to the rewritable non-volatile memory module 406 is converted into a format acceptable to the rewritable non-volatile memory module 406 through the memory interface 506.

In an exemplary embodiment, the memory control circuit unit 404 further includes a buffer memory 508, a power management circuit 510, and an error checking and correcting circuit 512.

The buffer memory 508 is coupled to the memory management circuit 502 and is configured to temporarily store data and commands from the host system 11 or data from the rewritable non-volatile memory module 406.

The power management unit 510 is coupled to the memory management circuit 502 and is configured to control power of the memory storage device 10.

The error checking and correcting circuit 512 is coupled to the memory management circuit 502 and is configured to execute an error checking and correcting procedure to ensure correctness of data. Specifically, if the memory management circuit 502 receives a write command from the host system 11, the error checking and correcting circuit 512 generates an error checking and correcting code (ECC code) for data corresponding to the write command, and the memory management circuit 502 writes data and the ECC code corresponding to the write command into the rewritable non-volatile memory module 406. Subsequently, if the memory management circuit 502 reads the data from the rewritable non-volatile memory module 406, the error checking and correcting code corresponding to the data is also read, and the error checking and correcting circuit 512 may execute the error checking and correcting procedure for the read data according to the error checking and correcting code.

In this exemplary embodiment, a low density parity code (LDPC) is implemented by the error checking and collecting circuit 512. However, in another exemplary embodiment, the error checking and correcting circuit 512 may also be implemented by encoding/decoding algorithms including a BCH code, a convolutional code, a turbo code, a bit flipping, etc.

Specifically, the memory management circuit 502 generates an error correction code frame (ECC frame) according to the received data and the corresponding error checking and correcting code (a.k.a. an error correction code) and writes the error correction code frame into the rewritable non-volatile memory module 406. Then, if the memory management circuit 502 reads data from the rewritable non-volatile memory module 406, the error checking and correcting circuit 512 can verify the correctness of the read data according to the error correction code in the error correction code frame.

In the following description, the operations executed by the memory management circuit 502, the host interface 504, the memory interface 506, the buffer memory 508, the power management circuit 510, and the error checking and correcting circuit 512 may also be referred to as being executed by the memory control circuit unit 404.

Figure 6A:
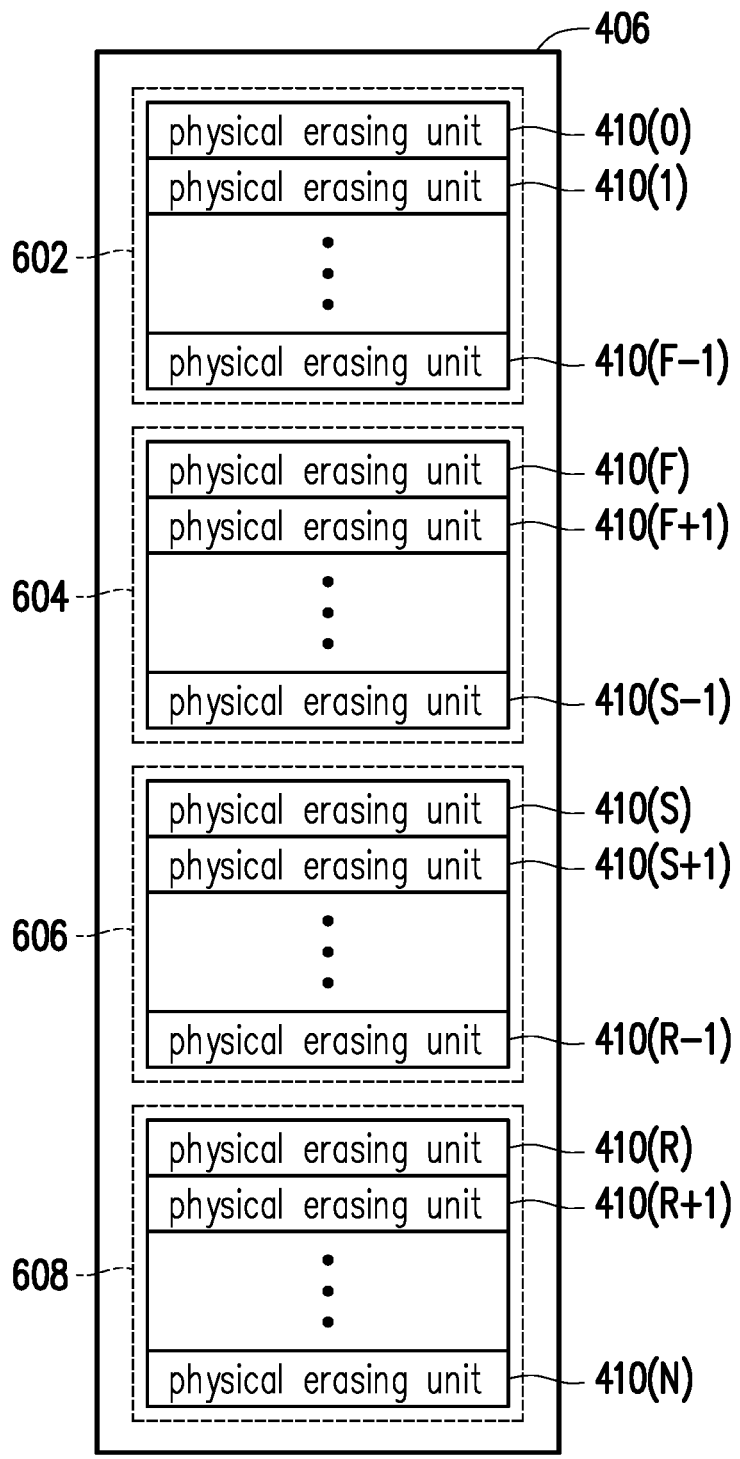
FIG. 6A and FIG. 6B are schematic diagrams illustrating management of the physical erasing units according to an exemplary embodiment.
Figure 6B:
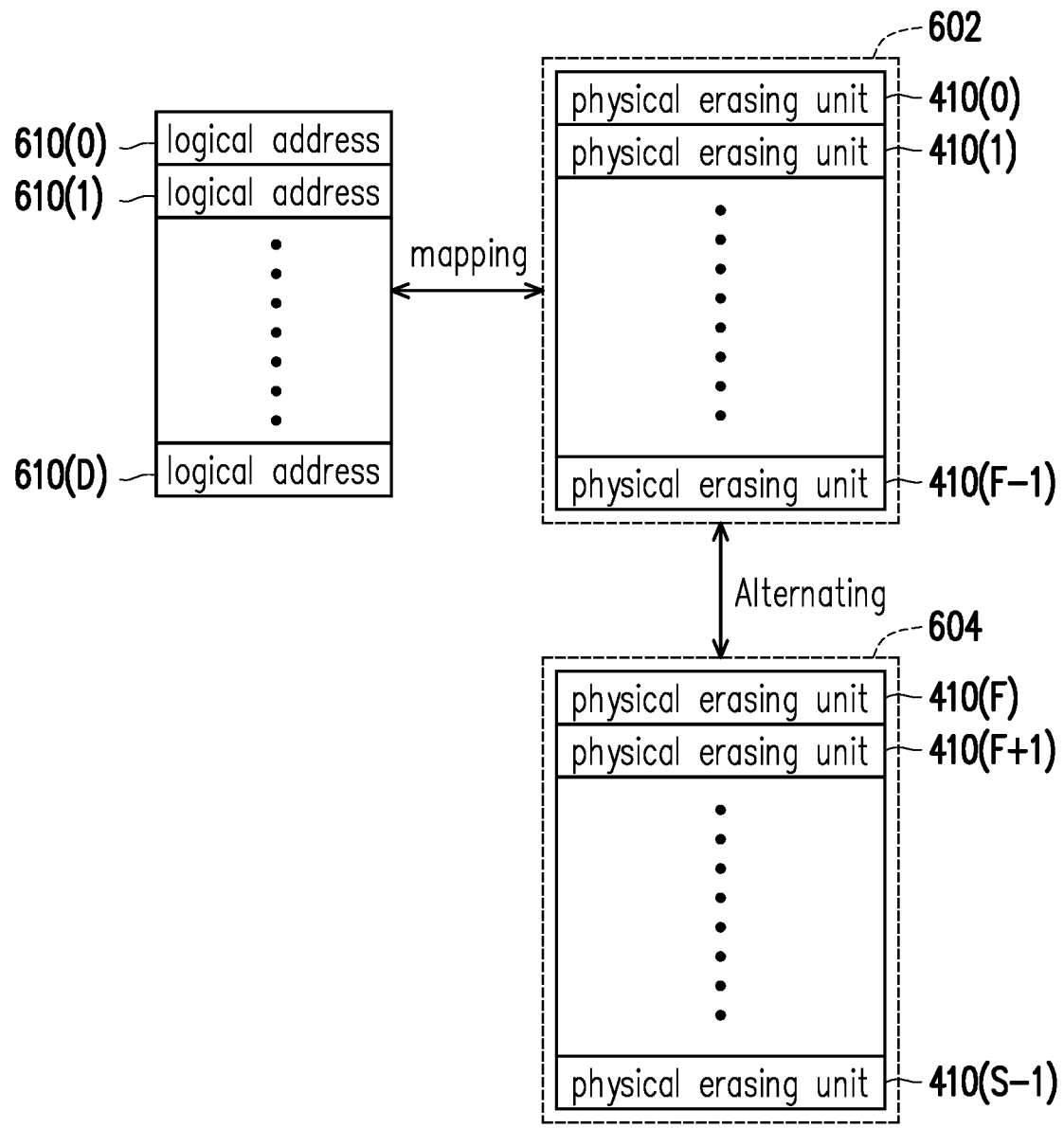

FIG. 6A and FIG. 6B are schematic diagrams illustrating management of the physical erasing units according to an exemplary embodiment.

It should be understood that terms, such as "get", "select", "group", "divide", "associate" and so forth, are logical concepts which describe operations in the physical erasing units of the rewritable non-volatile memory module 406. In other words, the physical erasing units of the rewritable non-volatile memory module are logically operated so actual positions of the physical units of the rewritable non-volatile memory module are not changed.

In general, before the memory storage apparatus 10 leaves the factory, manufacturers will perform a formatting operation for the memory storage apparatus 10 by using a Mass Production tool (MP tool) so as to perform initialization.

Referring to FIG. 6A, the memory control circuit unit 404 (or the memory management circuit 502) may logically group the physical erasing units 410(0) to 410(N) into a data area 602, a spare area 604, a system area 606, and a replacement area 608.

The physical erasing units logically belonging to the data area 602 and the spare area 604 are configured to store data from the host system 11. More specifically, the physical erasing units of the data area 602 are regarded as the physical erasing units stored with data, whereas the physical erasing units of the spare area 604 are configured to replace the physical erasing units of the data area 602. In other words, if the write command and the data to be written are received from the host system 11, the memory management circuit 502 retrieves the physical erasing units from the spare area 604 and writes the data into the retrieved physical erasing units in order to replace the physical erasing units in the data area 602.

The physical erasing units logically belonging to the system area 606 are configured to record system data. For example, the system data includes information related to the manufacturer and model number of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, if normal physical erasing units are still available in the replacement area 608 if the physical erasing units of the data area 602 are damaged, the memory management circuit 502 retrieves the normal physical erasing units from the replacement area 608 for replacing the damaged physical erasing units.

Particularly, the numbers of the physical erasing units in the data area 602, the spare area 604, the system area 606, and the replacement area 608 may be different from one another according to different memory specifications. In addition, it should be understood that, during operations of the memory storage device 10, grouping relations of the physical erasing units for associating with the data area 602, the spare area 604, the system area 606, and the replacement area 608 may be dynamically changed. For example, if the damaged physical erasing units in the spare area 604 are replaced by the physical erasing units in the replacement area 608, the physical erasing units originally from the replacement area 608 are then associated with the spare area 604.

Referring to FIG. 6B, as described above, the physical erasing units of the data area 602 and the spare area 604 are configured for storing data written from the host system 11 in an alternating manner. In this exemplary embodiment, the memory management circuit 502 allocates logical addresses 610(0) to 610(D) to the host system 11 for mapping part of physical erasing units 410(0) to 410(F−1) in the data area 602, so as to facilitate data accessing in the physical erasing units stored with data in said alternating manner. Particularly, the host system 11 accesses the data in the data area 602 through the logical addresses 610(0) to 610(D). Further, the memory management circuit 502 establishes a logical-physical mapping table to record a mapping relation between the logical addresses and the physical erasing units. The logical-physical mapping table may also be configured to record various logical and physical corresponding relations, for example, between the logical addresses and the physical programming units, between logical programming units and the physical programming units, and/or between the logical programming units and the physical erasing units, but the invention is not limited thereto.

Referring to FIG. 6A again, the memory management circuit 502 records the corresponding programming or erasing count of each of the physical erasing units 410(0) to 410(N). To be specific, the programming or erasing count of each of the physical erasing units 410(0) to 410(N) is limited. For example, the physical erasing unit is damaged after being erased 10,000 times. If the wear of the physical erasing units causes loss of partial storage capacity or significant performance degradation, the data stored by the user may be lost or data may not be stored. In particular, the wear of the physical erasing units is determined by the number of times that each physical erasing unit is programmed or erased. That is, if one physical erasing unit is programmed (or written) only once and is not programmed thereafter, the degree of wear of the physical erasing unit is relatively low. On the contrary, if one physical erasing unit is programmed and erased repeatedly, the degree of wear of the physical erasing unit is relatively high. For example, if one of the physical erasing units of the rewritable non-volatile memory module 406 is programmed or erased, the memory management circuit 502 adds one value (e.g., 1) to/subtracts one value from the programming count or the erasing count (i.e., the number of times of operation or an operation value) corresponding to the physical erasing unit. The values are then compared, and the degree of wear is thereby obtained. Here, the operation value may be recorded in an operation value table or in a corresponding physical erasing unit.

Figure 7A:
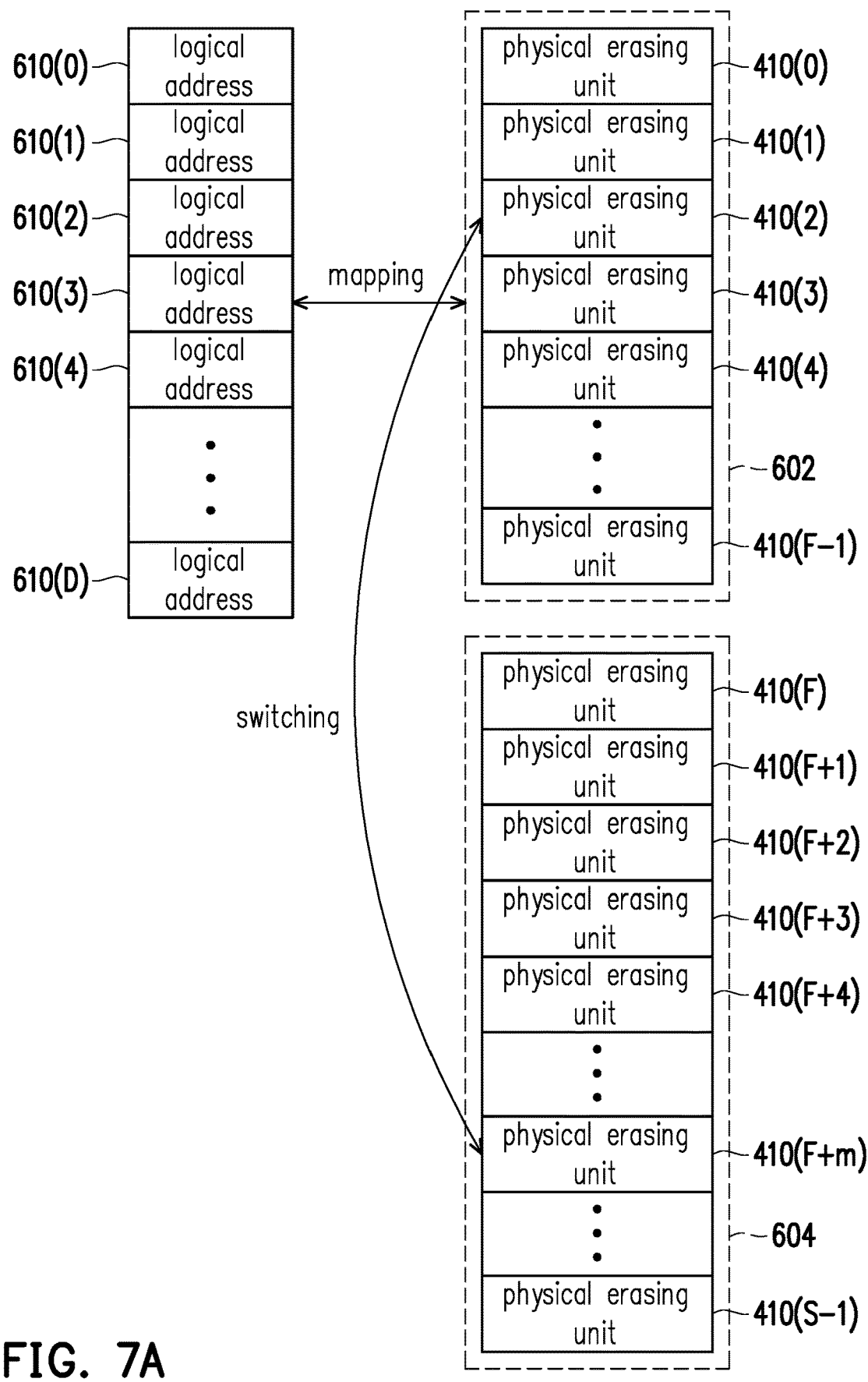
FIG. 7A illustrates a schematic diagram for executing a wear leveling operation according to an exemplary embodiment.

FIG. 7A illustrates a schematic diagram for executing a wear leveling operation according to an exemplary embodiment.

Referring to FIG. 7A, in an exemplary embodiment, if executing the wear leveling operation, the memory management circuit 502 selects a first physical erase unit and a second physical erase unit from physical erasing units 410(0) to 410(S−1) according to a usage situation value and an operation value of each of the physical erasing units 410(0) to 410(F−1) in the data area 602 and operation values of the physical erasing units 410(F) to 410(S−1) in the spare area 604. Moreover, the memory management circuit 502 copies valid data stored in the first physical erase unit to the second physical erase unit, so as to execute the wear leveling operation.

For example, if the memory management circuit 502 associates one physical erasing unit (a.k.a. a third physical erase unit) in the spare area 604 with the data area 602, the usage situation value of this physical erasing unit is set as a usage situation default value. For example, in this exemplary embodiment, the usage situation default value is set to 0. Further, the memory management circuit 502 counts the usage situation values of the rest of the physical erasing units except this physical erasing unit in the data area 602. For example, in this exemplary embodiment, 1 is added to the usage situation values of the rest of the physical erasing units. That is, every time if one physical erasing unit is associated with the data area 602, the usage situation value of this physical erasing unit is set to 0, and 1 is added to the usage situation values of the rest of the physical erasing units in the data area 602. In another exemplary embodiment, the usage situation default value may be set to 1000. Further, the memory management circuit 502 subtracts 1 from the usage situation values of the rest of the physical erasing units except this physical erasing unit in the data area 602. In another exemplary embodiment, the usage situation value may be set as a most recent time of this physical erasing unit being used.

For example, the user stores his/her favorite song to the physical erasing unit 410(2), and the physical erasing unit 410(2) is associated with the data area 602. After the rewritable non-volatile memory module 406 operates for a period of time, if the song stored in the physical erasing unit 410(2) is not updated for a long time and the wear leveling operation is executed since the rest of the physical erasing units 410(0), 410(1), and 410(3) to 410(F−1) stored with other data are updated frequently, the usage situation value of the physical erasing unit 410(2) is added by the memory management circuit 502. At the time being, the usage situation value of the physical erasing unit 410(2) is the greatest. Since the physical erasing unit 410(2) is not updated for a long time, a number of times of operation of the physical erasing unit 410(2) is relatively low. In other words, a degree of wear of the physical erasing unit 410(2) is relatively low.

In an exemplary embodiment, the memory management circuit 502 continues to monitor whether a greatest usage situation value in the usage situation values of the physical erasing units 410(0) to 410(F−1) of the data area 602 is equal to or greater than a first threshold. For example, if the usage situation value of the physical erasing unit 410(2) is the greatest, the memory management circuit 502 determines whether the usage situation value of the physical erasing unit 410(2) is equal to or greater than the first threshold. In addition, the memory management circuit 502 determines whether a difference value between an operation value of a physical erasing unit 410(F+m) in the spare area 604 and the operation value of the physical erasing unit 410(2) in the data area 602 is equal to or greater than a second threshold. Among them, the operation value of the physical erasing unit 410(F+m) is greater than the operation value of the physical erasing unit 410(2), and the usage situation value of the physical erasing unit 410(2) is equal to or greater than the first threshold.

If the usage situation value of the physical erasing unit 410(2) is equal to or greater than the first threshold and the difference value between the operation value of the physical erasing unit 410(F+m) and the operation value of the physical erasing unit 410(2) is equal to or greater than the second threshold, the memory management circuit 502 copies data stored in the physical erasing unit 410(2) to the physical erasing unit 410(F+m).

Specifically, if the wear leveling operation is executed, the memory management circuit 502 selects the physical erasing unit 410(2) (a.k.a. the first physical erasing unit) from the data area 602 (a.k.a. a first area) and selects the physical erasing unit 410(F+m) (a.k.a. the second physical erasing unit) from the spare area 604 (a.k.a. a second area). Among them, the difference value between the operation value of the physical erasing unit 410(F+m) and the operation value of the physical erasing unit 410(2) is equal to or greater than the second threshold, and the usage situation value of the physical erasing unit 410(2) is equal to or greater than the first threshold. If the wear leveling operation is executed, the memory management circuit 502 copies data stored in the physical erasing unit 410(2) to the physical erasing unit 410(F+m), maps the physical erasing unit 410(F+m) to the logical address 610(2), and updates the logical address-physical address mapping table, so as to associate the physical erasing unit 410(F+m) with the data area 602. Further, the memory management circuit 502 associates the physical erasing unit 410(2) (or the erased physical erasing unit 410(2)) with the spare area 604 and updates a spare area physical erasing unit queue table, so as to complete the wear leveling operation executed to the physical erasing unit 410(F+m) and the physical erasing unit 410(2). Here, the spare area physical erasing unit queue table is configured for recording information representing the physical erasing unit in the spare area 604, such as a serial number, an identification value, or the corresponding logical address of the physical erasing unit. That is, after the physical erasing unit 410(2) is associated with the spare area 604, the information of the physical erasing unit 410(2) is correspondingly recorded in the updated spare area physical erasing unit queue table.

After the wear leveling operation is executed, the memory management circuit 502 may instantly perform an erasing operation to the physical erasing unit 410(2) and counts the operation value of the physical erasing unit 410(2). Nevertheless, the invention is not limited thereto. In another exemplary embodiment, the memory management circuit 502 may execute the erasing operation to the physical erasing unit 410(2) only if it is required to write data into the physical erasing unit 410(2).

In the foregoing embodiment, the memory management circuit 502 retrieves the physical erasing unit 410(F+m) having a greatest operation value in the spare area 604 as the second physical erase unit and retrieves the physical erasing unit 410(2) having a least operation value and the greatest usage situation value in the data area 602 as the first physical erase unit to execute the wear leveling operation. That is, the operation value of the physical erasing unit 410(F+m) is greater than the operation values of the rest of the physical erasing units in the spare area 604, the operation value of the physical erasing unit 410(2) is less than the operation values of the rest of the physical erasing units in the data area 602, and the physical erasing unit 410(2) has the greatest usage situation value. Nevertheless, the retrieved first physical erasing unit and the second physical erasing unit are not limited by the invention. For example, in another exemplary embodiment, the memory management circuit 502 retrieves the physical erasing unit having a second largest operation value in the spare area 604 and retrieves the physical erasing units in the data area 602 and in the spare area 604 with a difference value between the operation values of the physical erasing units being equal to or greater than the second threshold and having the usage situation values equal to or greater than the first threshold to execute the wear leveling operation.

Figure 7B:
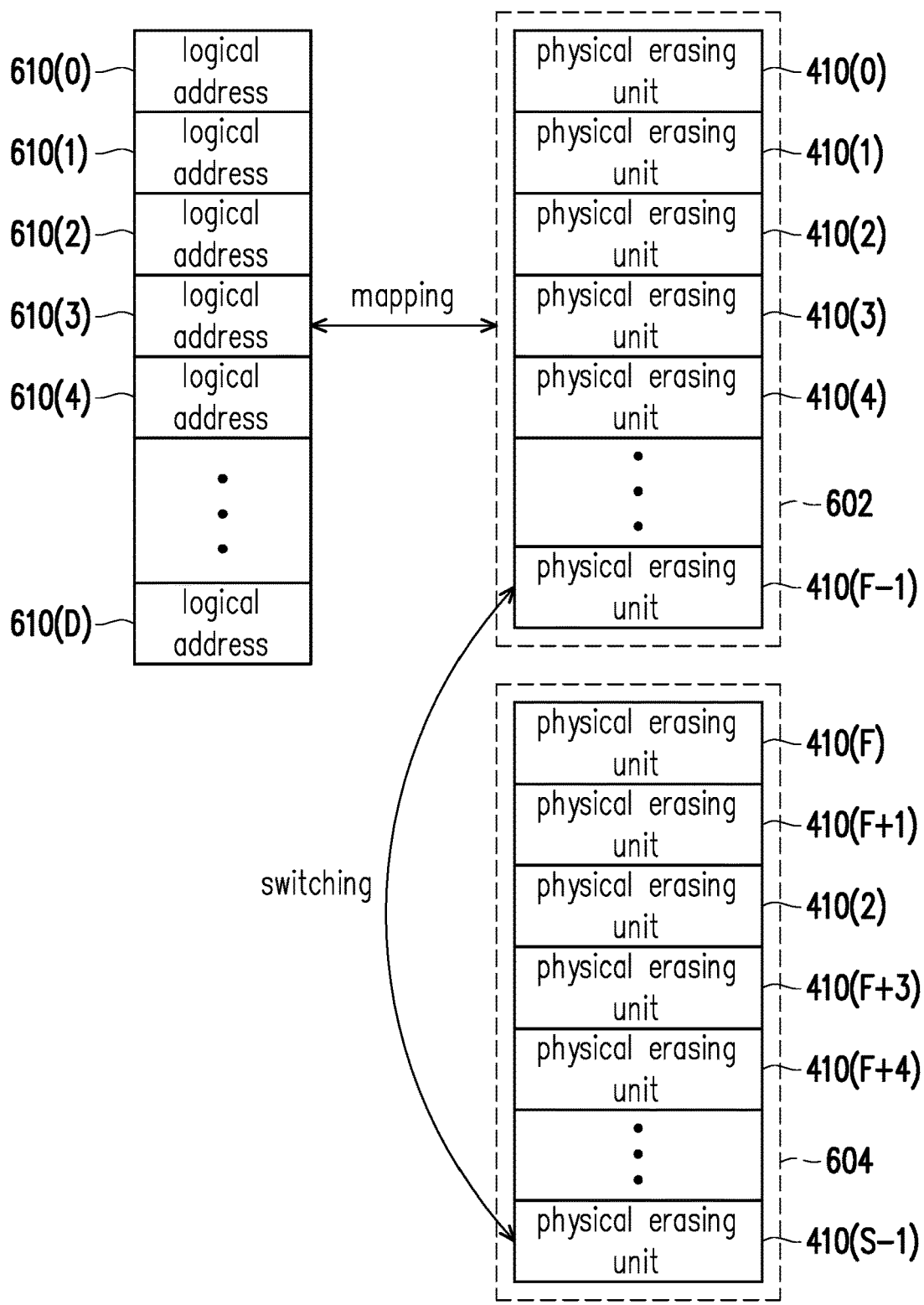
FIG. 7B illustrates a schematic diagram for executing a wear leveling operation according to another exemplary embodiment.

FIG. 7B illustrates a schematic diagram for executing a wear leveling operation according to another exemplary embodiment.

Referring to FIG. 7B, for example, in another exemplary embodiment, if the memory management circuit 502 associates one physical erasing unit (a.k.a. the third physical erase unit) in the spare area (a.k.a. the second area) 604 with the data area 602, the usage situation value of this physical erasing unit is set as the usage situation default value. In this exemplary embodiment, the usage situation default value is set to 1000. Further, the memory management circuit 502 counts the usage situation values of the rest of the physical erasing units except this physical erasing unit in the data area 602. For example, in this exemplary embodiment, 1 is subtracted from the usage situation values of the rest of the physical erasing units. That is, every time if one physical erasing unit is associated with the data area 602, the usage situation value of this physical erasing unit is set to 1000, and 1 is subtracted from the usage situation values of the rest of the physical erasing units in the data area 602. At the time being, the usage situation value of this physical erasing unit continues to decrease gradually and the operation value of this physical erasing unit does not increase. After the rewritable non-volatile memory module 406 operates for a period of time, the operation value of this physical erasing unit is relatively less than the operation values of the rest of the physical erasing units in the data area 602.

In an exemplary embodiment, the memory management circuit 502 continues to monitor whether the greatest usage situation value in the usage situation values of the physical erasing units 410(0) to 410(F−1) of the data area 602 is equal to or greater than the first threshold. The operation value of the physical erasing unit 410(S−1) in the spare area 604 is greater than the operation value of the physical erasing unit 410(F−1) in the data area 602. Moreover, after the memory management circuit 502 counts the usage situation values of the physical erasing units 410(0) to 410(F−1), if the usage situation value of the physical erasing unit 410(F−1) is equal to or greater than the first threshold and the difference value between the operation value of the physical erasing unit 410(S−1) and the operation value of the physical erasing unit 410(F−1) is equal to or greater than the second threshold, the memory management circuit 502 copies valid data stored in the physical erasing unit 410(F−1) to the physical erasing unit 410(S−1).

In an exemplary embodiment, if the usage situation value of the physical erasing unit having the greatest usage situation value in the data area 602 is equal to or greater than the first threshold, a difference value between the operation value of one physical erasing unit in the spare area 604 and the operation value of one physical erasing unit in the data area 602 is equal to or greater than the second threshold, and the usage situation value of this physical erasing unit in the data area 602 is equal to or greater than the first threshold, the memory manage circuit 502 executes the wear leveling operation. Here, the first threshold and the second threshold may be set according to execution performance and requirements of the memory storage apparatus 10.

Through foregoing execution of the wear leveling operation, the physical erasing unit (e.g., the physical erasing unit 410(2) or the physical erasing unit 410(F−1)) stored with older and less changed cold data can be selected. Moreover, the selected physical erasing unit not only has the greatest usage situation value but also has the relatively less operation value. In this way, the wear leveling operation is less likely to be executed to the physical erasing unit (e.g., the physical erasing unit 410(F+m) or the physical erasing unit 410(S−1)) having the greater operation value again. Moreover, the wear leveling operation is more likely to be performed to the physical erasing unit (e.g., the physical erasing unit 410(2) or the physical erasing unit 410(F−1)) originally stored with the cold data and having the relatively less operation value, and this physical erasing unit can be further configured to write data after the data is erased.

In the following, the wear leveling method of the invention is described in combination with an exemplary embodiment. The physical erasing unit stored with the cold data and having relatively less operation value in the data area 602 and the physical erasing unit having greater operation value in the spare area 604 are switched. As such, the degree of wear of the physical erasing unit is effectively equalized, and the lifespan of the rewritable non-volatile memory module 406 is thereby prolonged.

Figure 8:
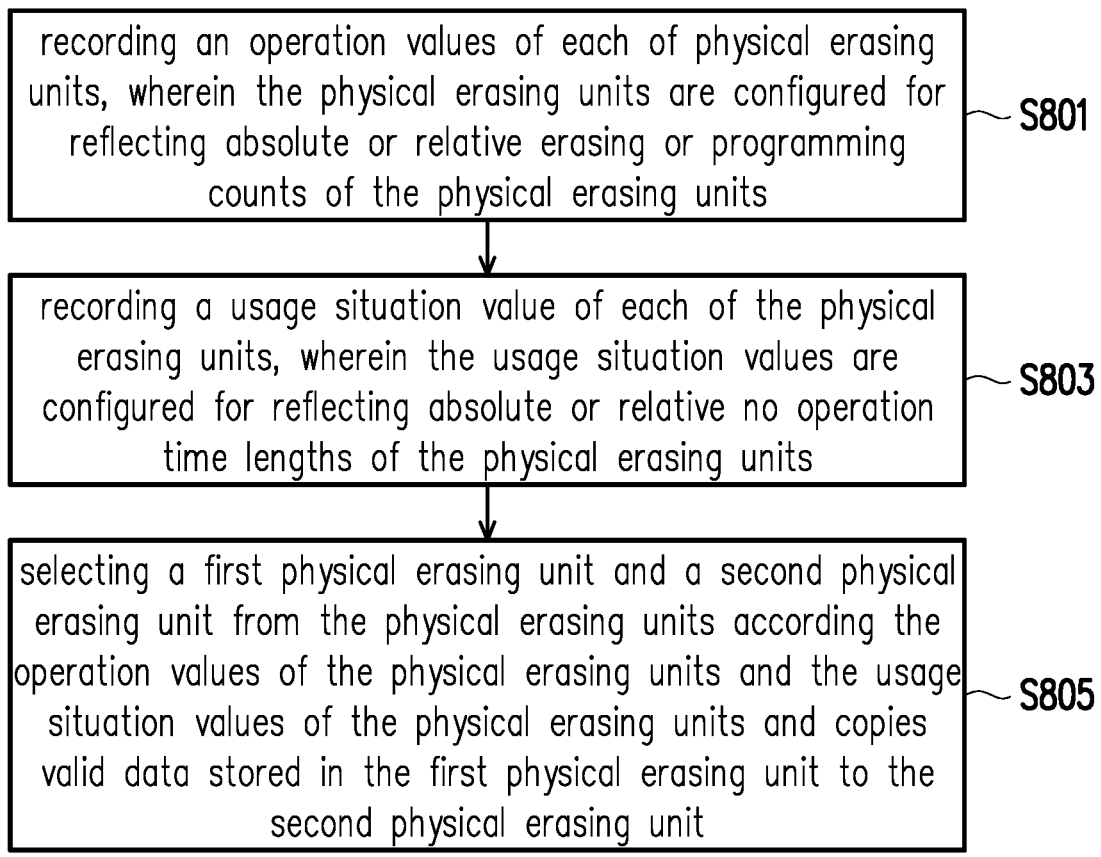
FIG. 8 is a flowchart illustrating a wear leveling method according to an exemplary embodiment.

FIG. 8 is a flowchart illustrating a wear leveling method according to an exemplary embodiment.

Referring to FIG. 8, in step S801, the memory management circuit 502 records the operation value of each of the physical erasing units. Herein, the operation values are configured for reflecting absolute or relative erasing or programming counts of the physical erasing units. Moreover, the operation value corresponding to each of the physical erasing units is recorded in the operation value table or in the corresponding physical erasing unit.

In step S803, the memory management circuit 502 records the usage situation value of each of the physical erasing units. Herein, the usage situation values are configured for reflecting absolute or relative no operation time lengths of the physical erasing units.

In step S805, the memory management circuit 502 selects the first physical erasing unit and the second physical erasing unit from the physical erasing units according the operation values of the physical erasing units and the usage situation values of the physical erasing units and copies valid data stored in the first physical erasing unit to the second physical erasing unit.

Figure 9:
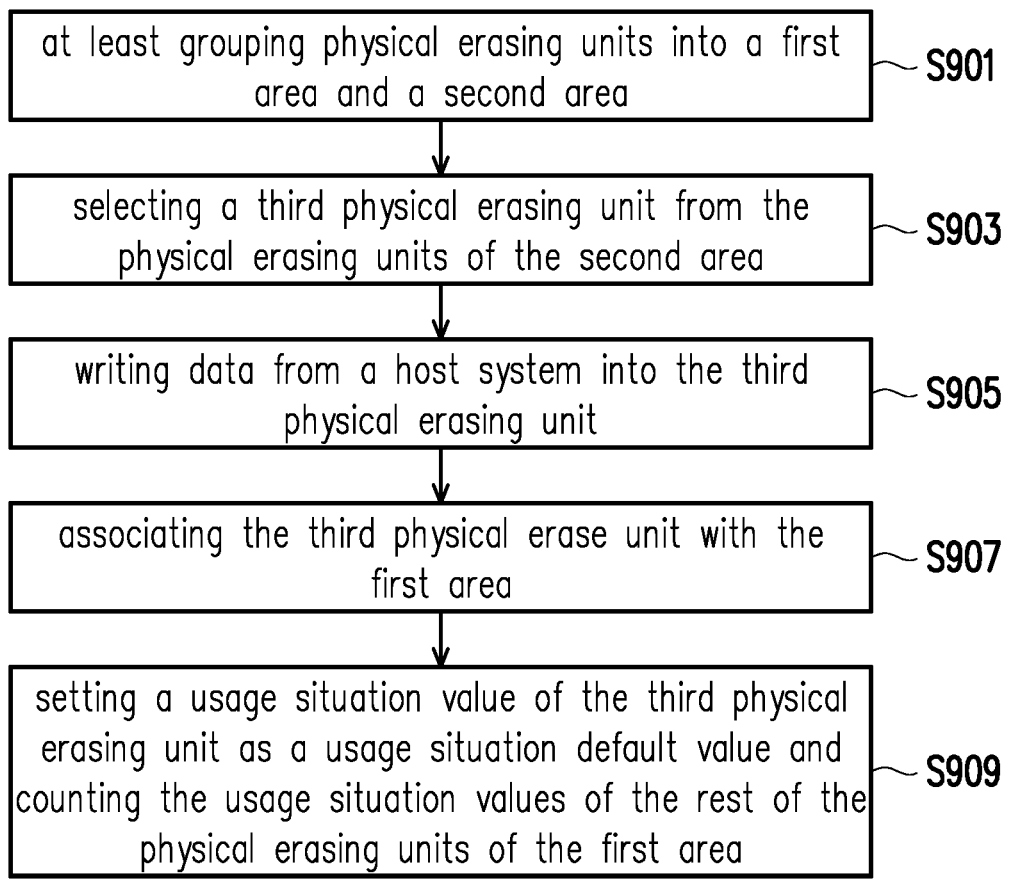
FIG. 9 is a specific flowchart illustrating execution of a wear leveling operation according to an exemplary embodiment.

FIG. 9 is a specific flowchart illustrating execution of a wear leveling operation according to an exemplary embodiment.

In step S901, the memory management circuit 502 at least groups the physical erasing units into a first area and a second area.

In step S903, the memory management circuit 502 selects the third physical erasing unit from the physical erasing units of the second area.

In step S905, the memory management circuit 502 writes data from a host system into the third physical erasing unit.

In step S907, the memory management circuit 502 associates the third physical erase unit with the first area.

In step S909, the memory management circuit 502 sets the usage situation value of the third physical erasing unit as the usage situation default value and counts the usage situation values of the rest of the physical erasing units of the first area. Specifically, the first area is the data area 602, and the second area is the spare area 604 in this embodiment. The memory management circuit 502 sets the usage situation default value of the third physical erasing unit associated with the data area 602 to 0 and counts the usage situation values of the rest of the physical erasing units of the data area 602. That is, the memory management circuit 502 adds 1 to the usage situation values of the rest of the physical erasing units except the third physical erasing unit in the data area 602 for counting. In another exemplary embodiment, the memory management circuit 502 sets the usage situation default value as the greatest usage situation value and subtracts 1 from the usage situation values of the rest of the physical erasing units except the third physical erasing unit in the data area 602 for counting.

Figure 10:
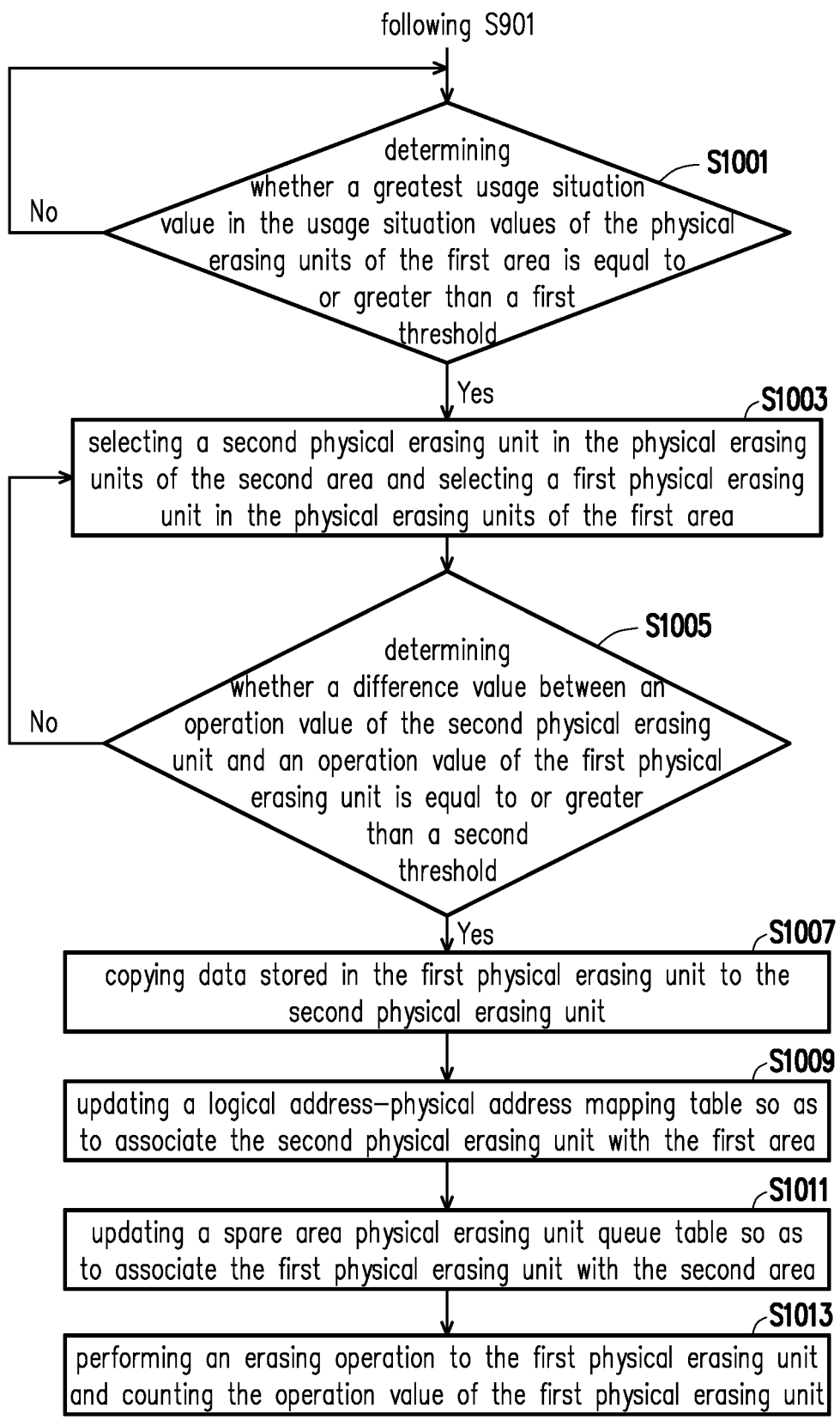
FIG. 10 is a specific flowchart illustrating step S805 according to an exemplary embodiment.

FIG. 10 is a specific flowchart illustrating step S805 according to an exemplary embodiment.

Referring to FIG. 10, in step S1001, the memory management circuit 502 determines whether the greatest usage situation value in the usage situation values of the physical erasing units of the first area is equal to or greater than the first threshold.

In step S1003, the memory control circuit unit 502 selects the second physical erasing unit in the physical erasing units of the second area and selects the first physical erasing unit in the physical erasing units of the first area.

In step S1005, the memory management circuit 502 determines whether the difference value between the operation value of the second physical erasing unit and the operation value of the first physical erasing unit is equal to or greater than the second threshold.

If the difference value between the operation value of the second physical erasing unit and the operation value of the first physical erase unit is equal to or greater than the second threshold, the memory management circuit 502 copies the data stored in the first physical erasing unit to the second physical erasing unit in step S1007.

In step S1009, the memory management circuit 502 updates the logical address-physical address mapping table so as to associate the second physical erasing unit with the first area.

In step S1011, the memory management circuit 502 updates the spare area physical erasing unit queue table, so as to associate the first physical erasing unit with the second area.

In step S1013, the memory management circuit 502 performs the erasing operation to the first physical erasing unit and counts the operation value of the first physical erasing unit.

In view of the foregoing, in the wear leveling method, the memory control circuit unit, and the memory storage apparatus provided by the embodiments of the invention, whether data not being frequently updated is stored in the physical erasing unit in the data area can be determined according to the operation value and the usage situation value of the physical erasing unit in the data area and the operation value of the physical erasing unit in the spare area. Further, the wear leveling operation can be performed to the physical erasing unit stored with the data not being frequently updated and the physical erasing unit having a greater operation value in the spare area, and in this way, the physical erasing unit having the greater operation value is less likely to be switched to the data area again to be programmed. As such, the numbers of times of operation of the physical erasing units are equalized, and that the lifespan of the rewritable non-volatile memory module is prolonged.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wear leveling method for a rewritable non-volatile memory module, the rewritable non-volatile memory module comprising a plurality of physical erasing units, the wear leveling method comprising:
   recording, by a memory management circuit, an operation value of each of the physical erasing units, wherein the operation values are configured for reflecting absolute or relative erasing or programming counts of the physical erasing units;
   recording, by the memory management circuit, a usage situation value of each of the physical erasing units, wherein the usage situation values are configured for reflecting absolute or relative no operation time lengths of the physical erasing units; and
   selecting, by the memory management circuit, a first physical erasing unit and a second physical erasing unit from the physical erasing units according the operation values and the usage situation values of the physical erasing units and copying valid data stored in the first physical erasing unit to the second physical erasing unit;
   grouping, by the memory management circuit, the physical erasing units at least into a first area and a second area;
   selecting, by the memory management circuit, a third physical erasing unit from the physical erasing units of the second area;
   sending, by the memory management circuit, a write command sequence which instructs a writing of data from a host system into the third physical erasing unit;
   associating, by the memory management circuit, the third physical erasing unit with the first area; and
   setting, by the memory management circuit, the usage situation value of the third physical erasing unit as a usage situation default value and counting, by the memory management circuit, the usage situation values of the rest of the physical erasing units of the first area.

2. The wear leveling method as claimed in claim 1, wherein in the step of setting the usage situation value of the third physical erasing unit as the usage situation default value and counting the usage situation values of the rest of the physical erasing units of the first area, the usage situation value of the third physical erasing unit is set to 0, and 1 is added to the usage situation values of the rest of the physical erasing units in the first area.

3. The wear leveling method as claimed in claim 1, wherein the step of selecting the first physical erasing unit and the second physical erasing unit from the physical erasing units according the operation values of the physical erasing units and the usage situation values of the physical erasing units and copying data stored in the first physical erasing unit to the second physical erasing unit comprises:
   determining whether a greatest usage situation value in the usage situation values of the physical erasing units of the first area is equal to or greater than a first threshold;
   selecting the second physical erasing unit in the physical erasing units of the second area and selecting the first physical erasing unit in the physical erasing units of the first area if the greatest usage situation value is equal to or greater than the first threshold;
   determining whether a difference value between the operation value of the second physical erasing unit and the operation value of the first physical erasing unit is equal to or greater than a second threshold; and
   copying the data stored in the first physical erasing unit to the second physical erasing unit if the difference value is equal to or greater than the second threshold.

4. The wear leveling method as claimed in claim 3, wherein the step of selecting the first physical erasing unit and the second physical erasing unit from the physical erasing units according the operation values of the physical erasing units and the usage situation values of the physical erasing units and copying the data stored in the first physical erasing unit to the second physical erasing unit further comprises:
   updating a logical address-physical address mapping table for associating the second physical erasing unit with the first area; and
   updating a spare area physical erasing unit queue table for associating the first physical erasing unit with the second area.

5. The wear leveling method as claimed in claim 3, further comprising:
   performing an erasing operation to the first physical erasing unit and counting the operation value of the first physical erasing unit.

6. A memory control circuit unit for controlling a rewritable non-volatile memory module, the writable non-volatile memory module comprising a plurality of physical erasing units, the memory control circuit unit comprising:
   a host interface, coupled to a host system;
   a memory interface, coupled to the rewritable non-volatile memory module; and
   a memory management circuit, coupled to the host interface and the memory interface,
   wherein the memory manage circuit is configured for recording an operation value of each of the physical erasing units, wherein the operation values are configured for reflecting absolute or relative erasing or programming counts of the physical erasing units,
   wherein the memory manage circuit is further configured for recording a usage situation value of each of the physical erasing units, wherein the usage situation values are configured for reflecting absolute or relative no operation time lengths of the physical erasing units, wherein the memory management circuit is further configured for selecting a first physical erasing unit and a second physical erasing unit from the physical erasing units according the operation values of the physical erasing units and the usage situation values of the physical erasing units and copying valid data stored in the first physical erasing unit to the second physical erasing unit, wherein the memory management circuit is further configured for grouping the physical erasing units at least into a first area and a second area, wherein the memory management circuit is further configured for selecting a third physical erasing unit from the physical erasing units of the second area, wherein the memory management circuit is further configured for sending a write command sequence which instructs a writing of data from a host system into the third physical erasing unit, wherein the memory management circuit is further configured for associating the third physical erasing unit with the first area, wherein the memory management circuit is further configured for setting the usage situation value of the third physical erasing unit as a usage situation default value and counting the usage situation values of the rest of the physical erasing units of the first area.

7. The memory control circuit unit as claimed in claim 6, wherein in the operation of the memory management circuit further configured for setting the usage situation value of the third physical erasing unit as the usage situation default value and counting the usage situation values of the rest of the physical erasing units of the first area, the usage situation value of the third physical erasing unit is set to 0, and 1 is added to the usage situation values of the rest of the physical erasing units in the first area.

8. The memory control circuit unit as claimed in claim 6, wherein the operation of the memory management circuit further configured for selecting the first physical erasing unit and the second physical erasing unit from the physical erasing units according the operation values of the physical erasing units and the usage situation values of the physical erasing units and copying data stored in the first physical erasing unit to the second physical erasing unit comprises:

the memory management circuit is further configured for determining whether a greatest usage situation value in the usage situation values of the physical erasing units of the first area is equal to or greater than a first threshold, the memory management circuit is further configured for selecting the second physical erasing unit in the physical erasing units of the second area and selecting the first physical erasing unit in the physical erasing units of the first area if the greatest usage situation value is equal to or greater than the first threshold, the memory management circuit is further configured for determining whether a difference value between the operation value of the second physical erasing unit and the operation value of the first physical erasing unit is equal to or greater than a second threshold, and the memory management circuit is further configured for copying the data stored in the first physical erasing unit to the second physical erasing unit if the difference value is equal to or greater than the second threshold.

9. The memory control circuit unit as claimed in claim 8, wherein the operation of the memory management circuit further configured for selecting the first physical erasing unit and the second physical erasing unit from the physical erasing units according the operation values of the physical erasing units and the usage situation values of the physical erasing units and copying the data stored in the first physical erasing unit to the second physical erasing unit comprises:

the memory management circuit is further configured for updating a logical address-physical address mapping table for associating the second physical erasing unit with the first area, and the memory management circuit is further configured for updating a spare area physical erasing unit queue table for associating the first physical erasing unit with the second area.

10. The memory control circuit unit as claimed in claim 8, wherein the memory management circuit is further configured for performing an erasing operation to the first physical erasing unit and counting the operation value of the first physical erasing unit.

11. A memory storage apparatus, comprising:

a connection interface unit, coupled to a host system;

a rewritable non-volatile memory module, comprising a plurality of physical erasing units; and a memory control circuit unit, coupled to the connection interface unit and the rewritable non-volatile memory module, wherein the memory control circuit unit is configured for recording an operation value of each of the physical erasing units, wherein the operation values are configured for reflecting absolute or relative erasing or programming counts of the physical erasing units, wherein the memory control circuit unit is further configured for recording a usage situation value of each of the physical erasing units, wherein the usage situation values are configured for reflecting absolute or relative no operation time lengths of the physical erasing units, and wherein the memory control circuit unit is further configured for selecting a first physical erasing unit and a second physical erasing unit from the physical erasing units according the operation values of the physical erasing units and the usage situation values of the physical erasing units and copying valid data stored in the first physical erasing unit to the second physical erasing unit, wherein the memory control circuit unit is further configured for grouping the physical erasing units at least into a first area and a second area, wherein the memory control circuit unit is further configured for selecting a third physical erasing unit from the physical erasing units of the second area, wherein the memory control circuit unit is further configured for sending a write command sequence which instructs a writing of data from a host system into the third physical erasing unit, wherein the memory control circuit unit is further configured for associating the third physical erasing unit with the first area, wherein the memory control circuit unit is further configured for setting the usage situation value of the third physical erasing unit as a usage situation default value and counting the usage situation values of the rest of the physical erasing units of the first area.

12. The memory storage apparatus as claimed in claim 11, wherein in the operation of the memory control circuit unit further configured for setting the usage situation value of the third physical erasing unit as the usage situation default value and counting the usage situation values of the rest of the physical erasing units of the first area, the usage situation value of the third physical erasing unit is set to 0, and 1 is added to the usage situation values of the rest of the physical erasing units in the first area.

13. The memory storage apparatus as claimed in claim 11, wherein the operation of selecting the first physical erasing unit and the second physical erasing unit from the physical erasing units according the operation values of the physical erasing units and the usage situation values of the physical erasing units and copying data stored in the first physical erasing unit to the second physical erasing unit by the memory control circuit unit further comprises:
   the memory control circuit unit is further configured for determining whether a greatest usage situation value in the usage situation values of the physical erasing units of the first area is equal to or greater than a first threshold,
   the memory control circuit unit is further configured for selecting the second physical erasing unit the physical erasing units of the second area and selecting the first physical erasing unit in the physical erasing units of the first area,
   the memory control circuit unit is further configured for determining whether a difference value between the operation value of the second physical erasing unit and the operation value of the first physical erasing unit is equal to or greater than a second threshold, and
   the memory control circuit unit is further configured for copying the data stored in the first physical erasing unit to the second physical erasing unit if the difference value is equal to or greater than the second threshold.

14. The memory storage apparatus as claimed in claim 13, wherein the operation of the memory control circuit unit further configured for selecting the first physical erasing unit and the second physical erasing unit from the physical erasing units according the operation values of the physical erasing units and the usage situation values of the physical erasing units and copying the data stored in the first physical erasing unit to the second physical erasing unit comprises:
   the memory control circuit unit is further configured for updating a logical address-physical address mapping table for associating the second physical erasing unit with the first area, and
   the memory control circuit unit is further configured for updating a spare area physical erasing unit queue table for associating the first physical erasing unit with the second area.

15. The memory storage apparatus as claimed in claim 13, wherein
   the memory control circuit unit is further configured for performing an erasing operation to the first physical erasing unit and counting the operation value of the first physical erasing unit.

* * * * *